*Boardman & Sweet,*
*Winding Lines.*

№ 12,668. Patented Apr. 10, 1855.

UNITED STATES PATENT OFFICE.

BYRON BOARDMAN AND GEORGE C. SWEETT, OF NORWICH, CONNECTICUT.

MACHINE FOR WINDING UP LINES, TWIST, OR CORD.

Specification of Letters Patent No. 12,668, dated April 10, 1855.

*To all whom it may concern:*

Be it known that we, BYRON BOARDMAN and GEORGE C. SWEETT, of Norwich, in county of New London and State of Connecticut, have invented a new and useful Machine for Winding Up Lines, Twist, or Cord of Any Description; and we do hereby declare that the following is a full, clear, and exact description of the same, reference being had to the accompanying drawings, in which—

Figure 1:
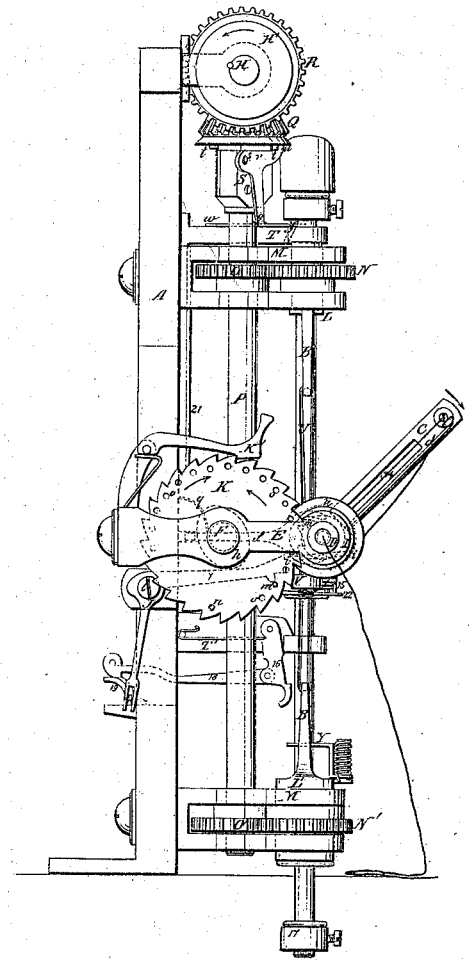
Figure 2:
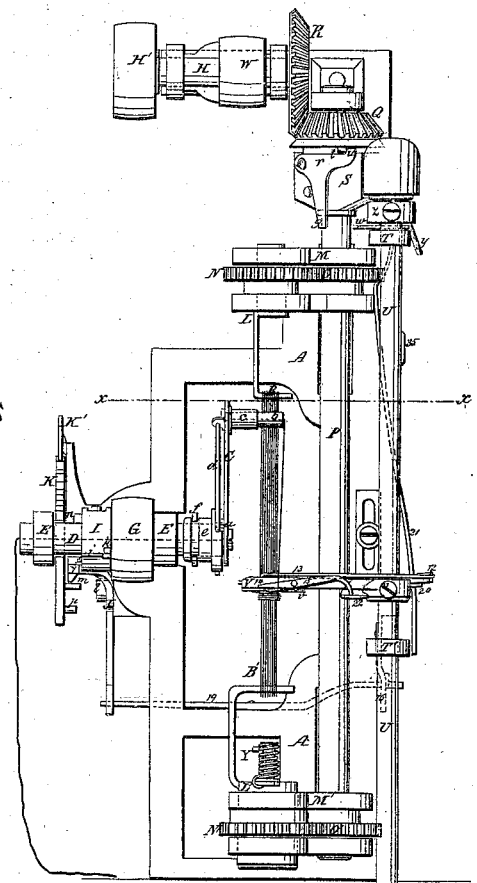
Figure 3:
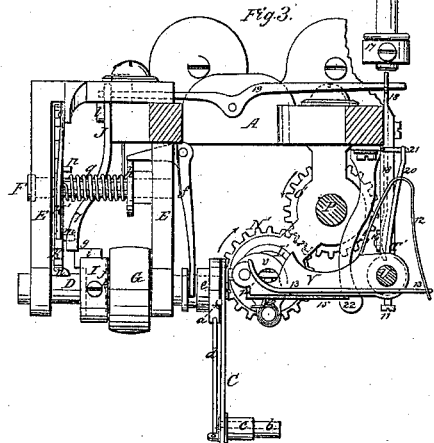
Figure 4:
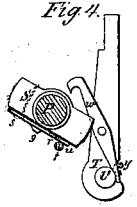
Figure 5:

Figure 1 is a side elevation of the machine. Fig. 2 is a front elevation of the same. Fig. 3 is a horizontal section in the line $x$, $x$, of Figs. 1 and 2. Fig. 4 is a plan of the devices and appliances by which the woolding mechanism is thrown into and out of operation. Fig. 5 is a section of a portion of the mechanism by which the laying apparatus is thrown into and out of operation.

Similar letters of reference indicate corresponding parts in the several figures.

The machine which forms the subject of this invention is intended to wind up fishing lines, or to wind cord, twist or any such material into hanks or skeins of such length as may be desired for sale or use.

A is a standard which supports all the working parts of the machine. The principal working parts consist of two hooks B, and B', which are placed at a distance apart corresponding with the length to which the line is to be wound, and a sweep C, which is capable of rotating around the hooks. The hooks remain stationary and the crank rotates around them to lay a sufficient quantity of line around them, and then the crank becomes stationary and the hooks rotate to perform the woolding.

The sweep C, resembles a crank and is attached to the inner end of a shaft D, which works in bearings in a frame E, E, secured to the standard. This shaft is hollow or tubular from the outer end nearly or quite up to the sweep in order that the line to be wound may enter its outer end, pass through its interior and come out at the hole $a$, near the sweep from whence it passes to and through the tube $b$, at the extremity of the sweep. At the time of the revolution of the sweep the hooks stand in the position the reverse of that shown in Fig. 2, that is to say with their points toward the sweep, and hence the tube $b$, is free to pass around them. The tube $b$, fits to slide freely lengthwise in a fixed socket $c$, attached to the sweep for the purpose of laying the line evenly around the hooks and preventing its getting in heaps. It is connected for this purpose by a light rod $d$, with a sliding collar $e$ on the shaft D, the said collar being embraced by and receiving motion from a fork on an elbow lever $f$, which works on a fixed fulcrum $g$ and receives a vibrating motion from a cam $h$, on a shaft F which stands in rear of and parallel with the sweep shaft D.

The sweep shaft D, is furnished with a pulley G, to receive rotary motion through a belt from a pulley H', on the main shaft H of the machine. This pulley G, is not secured permanently to the sweep shaft but is loose and carries on one side a pin $k$, which so long as the laying of the line upon the hooks is desired to continue, catches a sliding piece $i$, in a cylinder I, which is secured to the shaft. The action of this sliding piece is illustrated in a separate sectional view, Fig. 5. The slide is acted upon by a spring $j$, which is coiled within the cylinder to force it in the direction of the arrow shown upon it in Fig. 5 and being the part 6, in contact with the pin; but when it is desired to liberate the shaft from the pulley and stop its revolution, the sliding piece has to be thrown back to allow the part 6 to clear the pin $k$. This is effected by means of the arms 7 of an elbow lever J, which works on a fulcrum in the side of the standard A and is operated upon in the following manner by means of a pin $m$ on the side of a ratchet wheel K, which is secured to the shaft F. This ratchet wheel is engaged by a tooth $n$, on the sweep shaft D, and by this tooth is caused to move one tooth during each revolution of the sweep until the pin $m$, lifts the end of the arm 7, to such a position as to meet the end 8, of the sliding piece $i$, after which a slightly continued revolution of the cylinder causes the sliding piece to be thrown back by the end of the arm, far enough to clear the pin $k$. This disengagement of its pulley from the sweep shaft takes place while the sweep is in the position represented in Figs. 1, 2 and 3 in which position, during the woolding operation the sweep shaft is locked by the arm 7, arresting the slide and preventing the revolution in one direction and the ratchet wheel arresting the tooth $n$, and preventing the revolution in the other. The ratchet wheel is held by a pawl K.

In order to vary the quantity or length of line to be laid, the position of the pin $m$, is made variable by providing a number of holes $o, o,$ in the ratchet wheel to receive it. At the commencement of the laying operation a pin $p$, on the inner face of the ratchet wheel is in contact with the upper side of the arm, where it is held by a spring $q$, applied to the ratchet wheel and coiled around its shaft. By setting the pin $m$, nearer to or farther from this pin $p$, it is obvious that the sweep is allowed to make a less or greater number of revolutions before the pin $m$, disengages the pulley G.

To enable the hooks B and B', to receive the requisite rotary motion to perform the woolding operation, they are attached to pivots L, and L', which stand in the same vertical line and work in bearings in two brackets M and M', bolted to the standard A. These pivots carry spur wheels N, N', through which they receive their rotary motion from two other spur wheels O, O', on the upright shaft P, which receives motion as soon as the laying operation previously described ceases, through a bevel toothed wheel Q, at its upper end from another bevel toothed wheel R on the main shaft H. The wheel Q is loose upon the shaft P, and is disengaged from it during the laying operation so as to rotate without the shaft. The engagement of the wheel and shaft is effected by means of a spring latch $r$, pivoted at $s$ to a block S, which is secured to the shaft, the point $u$, of the said latch catching one of two studs $t$, on the lower side of the wheel Q. The spring 10 which holds the latch in operation is shown dotted in Fig. 4, passing through the block S. The disengagement of the wheel was effected during the laying operation by means of a hook $w$, shown in Figs. 1, 2 and 4, pivoted at $x$, to a fixed bracket T, which catches the tail 9, of the latch and holds its point clear of the pins $t$, but during the woolding operation the hook is kept clear of the latch by reason of its tail being held by a pin $y$, attached to a collar $z$, on an upright rod U, which may be termed the clasp rod.

During the woolding operation the line laid on the hooks is clasped by a clasp V $v$, above where the woolding is being wound on. This clasp is best shown in Fig. 3. It consits of two jaws one V of which is secured firmly by a screw 11, to the rod U, which is free to slide up and down in two guides in brackets T, T', attached to the standard A, and the other $v$, is pivoted to V. The movable jaw $v$, is closed by a curved spring 12, which is attached at one end to the butt of V, and at the other to a rod 13, connecting with the said movable jaw. The clasp is opened when desired by compressing the spring 12, and when opened is held open by the rod 13, being caught by the point 14 of a catch lever 15, hung on the front of the fixed jaw V, as shown in red in Fig. 3, the said point being thrown up by the greater weight of the tail of the lever. During the operation of laying the line on the hooks, the clasp rod is raised up high enough to bring the clasp above the point of the upper hook B, out of the way of the line, and is held up in that position by means of a spring latch 16, upon which rests a collar 17 which is fast on the bottom of the rod. This latch is suspended from the guide bracket T', as shown in Fig. 1, and is connected to a rod 18, which takes hold of one end of a horizontal lever 19, the opposite end of which is connected with one arm of the lever J, herein before described. This connection, when the arm 7 of the lever J, is struck up by the pin $m$, is the means of throwing back that end of the lever 19, which the rod 18 takes hold of, and thus drawing back the catch 16, to liberate the clasp rod, and let it fall. In falling, the clasp rod is turned so far by a small arm 20, attached to the clasp, to work in contact with a curved guide rod 21, that the open clasp receives within it the laid line upon the hooks. The tail end of the catch lever 15, just before the descent of the clasp rod terminates comes in contact with a fixed stop 22, and the catch 14, of the said lever is thereby thrown down clear of the rod 13, to allow the clasp to be closed by the spring 12. The descent of the clasp rod also disengages the hook $w$, from the latch $r$, and connects the wheel Q, with the shaft P.

The lower pivot L' of the lower hook B' is made hollow and large enough to allow hanks or skeins which have been already wound, to drop through, and is furnished with a spring clasping piece Y, whose duty will be explained in describing the operation of winding.

The manner in which the winding is performed is as follows. Before the commencement of the operation, the sweep shaft D, the shaft F and all the parts connected therewith are in the condition represented in Figs. 1, 2 and 3 and the pulley G, to be disengaged but the clasp rod is raised to bring the clasp above the point of the upper hook B. The end of the line which is represented in blue color in the drawing supposed to be coming from a loose coil, enters the outer end of the shaft D, passes through the hole $a$, and from thence to and through the tube $b$, of the sweep C, before the machine is set in operation the end of the line should be hitched to the lower hook. The machine is started by the attendant lifting the pawl K', and allowing the ratchet wheel K, to be driven by the spring $q$, so far in the direction of the red arrow in Fig. 1, as to bring the pin $p$, in contact with the upper side of the arm 7, of the lever J, which stops the ratchet wheel and leaves the pulley G, engaged with the sweep shaft which with the sweep then commences to rotate in the direction of the arrows shown near them in Fig. 1, and to lay the line round the hooks B, B'. The laying operation continues until the ratchet wheel K, has been moved so far in the direction of the black arrow shown upon it as is necessary for the pin m, to raise the arm 7 of the lever J, to disengage the slide i, from the pin k, of the pulley G, and lock the sweep shaft, and to throw forward the lower arm of the said lever to operate upon the lever 19, and draw back the latch 16, to let fall the clasp rod U. The fall of the clasp rod beyond a certain point is prevented by the fixed jaw V of the clasp coming in contact with the stop 22 which then supports the clasp and rod. The clasp is arrested in the proper position to commence the woolding, and just previously to the termination of its fall the pin y, throws off the catch w, and allows the wheel Q to engage with the shaft P and set the hooks B, B', in motion. The line passes under the clasp which with its rod is raised as the woolding proceeds. The position of the sweep causes the woolding to be wound upward and the weight and resistance of the clasp pressing upon the line cause the coils to be regularly and closely laid.

The machine is represented in the drawings Figs. 1, 2 and 3, as performing the woolding operation. When the woolding has been performed to the desired height the wheel Q is disengaged from the shaft P by means of a projecting pin 35, on the side of the clasp rod which in passing the catch w, moves it into a position to catch the tail of the latch r. The machine now stops. The clasp is opened by the attendant and the clasp rod lifted high enough for the catch 16 to catch the collar 17 and support it and the line is taken from the hooks by the attendant and secured at the termination of the woolding by a half hitch. The wound line or hank is then dropped through the hollow of the pivot L', and held by the clasp. The attendant then raises the pawl K' and starts the machine when the previously described operation is repeated.

In order to vary the length of the hank or skein the brackets M, M' which carry the hooks and their wheels N, N', and also embrace the wheels O, O', are adjustable at different distances apart, the wheels O, O', being fitted to their shaft P, with a feather and groove for that purpose, and the length of the sweep is made variable by attaching it to its shaft by a screw passing through a slot 34. The position of the clasp V, and the collars v and 17, on the shaft U, are also variable for the purpose of varying the length of woolding.

What we claim as our invention, and desire to secure by Letters Patent, is,

1. The sweep composed as described of an arm C, attached to a hollow shaft D, and carrying a hollow tube b, which is caused by the revolution of the shaft to lay around the fixed hooks B, B', a line, cord, twist, or other fabric of similar character which is conducted through the shaft and the said tube, substantially as herein set forth.

2. So arranging, applying and operating the sweep, and the hooks around which it lays the line or other fabric, that the hooks shall remain stationary in a suitable position to receive the line or fabric while the sweep revolves around them, and that the hooks after the operation of the sweep terminates shall rotate upon axes in line with each other to perform the woolding, as herein fully described.

3. Giving the tube b, of the sweep a motion endwise simultaneously with its revolution by any means substantially as described, for the purpose of laying the line or fabric evenly on the hooks and preventing its being laid in heaps.

4. The manner of disengaging the pulley G or its equivalent which drives the sweep shaft, in order to stop the sweep at the proper time and in the proper position by means of the sliding piece i, the lever J, and the adjustable pin m, in the ratchet wheel K or its equivalent, deriving motion from the sweep shaft, all operating substantially as herein described.

5. The rod U, arranged and operating substantially as described for either or both of the purposes herein set forth viz, 1st, to carry a clasp V, v, which regulates the woolding and 2d, to carry fins, pins or other projections 35 and y, to operate a catch w, or its equivalent to cause the engagement and disengagement of the gearing which gives revolution to the hooks to perform the woolding.

6. The application to the clasp of a catch lever 15, operating substantially as described to hold the jaws open during the laying operation and to be caused to liberate them by the falling of the clasp to allow them to close ready for the woolding operation.

BYRON BOARDMAN.
GEO. C. SWEETT.

Witnesses:
BENJ. F. COBB,
H. ADDISON RICHARDSON.